US009792668B2

(12) United States Patent
Korkin (10) Patent No.: US 9,792,668 B2
(45) Date of Patent: Oct. 17, 2017

(54) PHOTOGRAPHIC IMAGE ACQUISTION DEVICE AND METHOD (71) Applicant: Entropix, Inc., La Canada, CA (US)

(72) Inventor: Mikhail Korkin, Glendale, CA (US)

(73) Assignee: Entropix, Inc., La Canada, CA (US)

( * ) Notice: Subject to any disclaimer, the term of this patent is extended or adjusted under 35 U.S.C. 154(b) by 106 days.

(21) Appl. No.: 14/981,518

(22) Filed: Dec. 28, 2015

(65) Prior Publication Data
US 2016/0117800 A1 Apr. 28, 2016

Related U.S. Application Data

(63) Continuation of application No. 14/828,503, filed on Aug. 17, 2015, now Pat. No. 9,225,889.

(60) Provisional application No. 62/038,801, filed on Aug. 18, 2014.

(51) Int. Cl.
| | | |
|---|---|---|
| H04N 5/225 | (2006.01) | |
| G06K 9/32 | (2006.01) | |
| G06T 3/40 | (2006.01) | |
| H04N 5/349 | (2011.01) | |
| H04N 5/232 | (2006.01) | |
| G06K 9/62 | (2006.01) | |
| H04N 5/262 | (2006.01) | |

(Continued)

(52) U.S. Cl.
CPC .......... *G06T 3/4053* (2013.01); *G06K 9/6215* (2013.01); *G06T 3/4007* (2013.01); *G06T 3/4015* (2013.01); *H04N 5/2258* (2013.01); *H04N 5/23232* (2013.01); *H04N 5/2621* (2013.01); *H04N 5/349* (2013.01); *H04N 9/045* (2013.01); *H04N 9/69* (2013.01)

(58) Field of Classification Search
CPC .................................................. G06T 3/4053
USPC ........................................................ 348/239
See application file for complete search history.

(56) References Cited

U.S. PATENT DOCUMENTS

| | | |
|---|---|---|
| 5,949,914 A | 9/1999 | Yuen |
| 6,011,875 A | 1/2000 | Laben |
| 6,476,865 B1 | 11/2002 | Gindele et al. |

(Continued)

FOREIGN PATENT DOCUMENTS

WO WO 2014/083489 6/2014

OTHER PUBLICATIONS

Buades, "A Non-Local Algorithm for Image Denoising," Computer Vision and Pattern Recognition, 2:60-65, 2005.

(Continued)

*Primary Examiner* — Joel Fosselman
(74) *Attorney, Agent, or Firm* — Lowenstein Sandler LLP (57) ABSTRACT

An image processing device receives a multi-spectral image and a panchromatic image of a scene. The device extracts a luminosity subcomponent image from the multi-spectral image and upsamples it to generate a luminosity image of a scale intended for a super-resolved image. For each pixel of the luminosity image, the device performs a series of pixel processing and replacement steps, including extracting a first image patch surrounding the pixel and matching it with a plurality of extracted panchromatic image patches, which are smaller than the first image patch by a ratio of a size of the panchromatic image to a size of the luminosity image. The image processing and replacement of the pixels may be iteratively performed to produce a super-resolved image.

29 Claims, 4 Drawing Sheets

(51) Int. Cl.
H04N 9/69 (2006.01)
H04N 9/04 (2006.01)

(56) References Cited

U.S. PATENT DOCUMENTS

| | | | |
|---|---|---|---|
| 7,199,348 B2 | 4/2007 | Olsen et al. | |
| 7,769,229 B2 | 8/2010 | O'Brien et al. | |
| 7,826,685 B2 | 11/2010 | Riley et al. | |
| 7,830,430 B2 | 11/2010 | Adams, Jr. et al. | |
| 7,835,594 B2 | 11/2010 | Riley et al. | |
| 7,889,921 B2 | 2/2011 | Morales et al. | |
| 8,115,825 B2 | 2/2012 | Culbert et al. | |
| 8,319,822 B2 | 11/2012 | McClatchie | |
| 8,320,712 B2 | 11/2012 | Choi et al. | |
| 8,471,918 B2 | 6/2013 | Imada | |
| 8,487,996 B2 * | 7/2013 | Mann | G01C 11/025 348/135 |
| 8,581,995 B2 | 11/2013 | Lin et al. | |
| 8,619,082 B1 | 12/2013 | Ciurea et al. | |
| 8,711,452 B2 | 4/2014 | Hamilton, Jr. et al. | |
| 8,854,420 B2 | 10/2014 | McClatchie | |
| 8,913,145 B2 | 12/2014 | Griffith et al. | |
| 9,020,256 B2 | 4/2015 | Deskevich et al. | |
| 2007/0103595 A1 | 5/2007 | Gong et al. | |
| 2009/0110285 A1 | 4/2009 | Elad et al. | |
| 2012/0044328 A1 | 2/2012 | Gere | |
| 2012/0086850 A1 | 4/2012 | Irani et al. | |
| 2012/0268623 A1 | 10/2012 | Morel et al. | |
| 2013/0129207 A1 | 5/2013 | Liu et al. | |
| 2014/0036112 A1 | 2/2014 | Scarff | |
| 2014/0118569 A1 | 5/2014 | Griffith et al. | |
| 2014/0192238 A1 | 7/2014 | Attar et al. | |
| 2014/0267759 A1 | 9/2014 | Leonard | |
| 2014/0368681 A1 | 12/2014 | Gustavsson et al. | |
| 2015/0036014 A1 | 2/2015 | Lelescu et al. | |
| 2015/0036015 A1 | 2/2015 | Lelescu et al. | |
| 2015/0085174 A1 | 3/2015 | Shabtay et al. | |
| 2015/0109468 A1 | 4/2015 | Laroia | |
| 2015/0109482 A1 | 4/2015 | Laroia | |
| 2015/0109484 A1 | 4/2015 | Laroia | |
| 2015/0109524 A1 | 4/2015 | Laroia | |
| 2015/0116547 A1 | 4/2015 | Laroia | |
| 2015/0117332 A1 | 4/2015 | Li et al. | |
| 2015/0124083 A1 | 5/2015 | Attar et al. | |

OTHER PUBLICATIONS

Glasner et al., "Super-Resolution from a Single Image," Computer Vision, IEEE 12th International Conference, 349-356, 2009.
Michaeli et al., "Nonparametric Blind Super Resolution," Weizmann Institute of Science, Israel.
Protter et al., "Generalizing the Nonlocal-Means to Super-Resolution Reconstruction," IEEE Transactions on Image Processing, vol. 18, No. 1, Jan. 2009.
Xu, et al., "Deep Convolutional Neural Network for Image Deconvolution," Advances in Neural Information Processing Systems, 2014.
Yang, et al., "Fast Direct Super-Resolution by Simple Functions," ICCV, 2013.
Yang, et al., Image Super-Resolution via Sparse Representation, Image Processing, IEEE Transactions on Image Processing, vol. 19, No. 11, 2861-2873.
International Search Report and Written Opinion filed November 23, 2015 in co-pending PCT application No. PCT/US15/45767.
Duran et al., "Implementation of Nonlocal Pansharpening Image Fusion"; Image Processing On Line; Feb. 2014, pp. 1-15.
International Search Report and Written Opinion dated Nov. 23, 2015, in co-pending PCT application No. PCT/US15/45767, 12 pages.
Michaeli et al., "Nonparametric Blind Super-Resolution," Weizmann Institute of Science, Israel, Dec. 1-8, 2013, pp. 945-952.
Yang et al., "Image Super-Resolution as Sparse Representation of Raw Image Patches," IEEE Transactions on Image Processing (TIP), vol. 19, Issue 11, Jun. 23, 2008, pp. 1-8.

* cited by examiner

PHOTOGRAPHIC IMAGE ACQUISTION DEVICE AND METHOD

CROSS-REFERENCES TO RELATED APPLICATIONS

This application is a continuation of U.S. patent application Ser. No. 14/828,503, filed Aug. 17, 2015, now U.S. Pat. No. 9,225,889, issued Dec. 29, 2015, which claims the benefit of priority to U.S. Provisional Patent Application No. 62/038,801 filed Aug. 18, 2014. Each foregoing application is incorporated herein its entirety by this reference.

BACKGROUND

Field of the Disclosure

The present disclosure relates to photographic image acquisition devices and methods thereof, and in particular to still and video cameras having at least one imaging lens optically coupled to at least one image sensor that includes a focal plane array of photosensitive elements.

Description of the Related Art

Spatial resolution of photographic image acquisition devices is limited by the spatial resolution of the image sensor that includes a focal plane array of photosensitive elements, and the point spread function (optical blur) of the imaging lens optically coupled to the sensor.

There are two basic approaches to increasing the spatial resolution of the image sensor. The first is by raising the spatial density of the focal plane array, and the second is by increasing the optical format of the image sensor and the lens to accommodate a larger number of photosensitive elements.

The first approach requires size reduction of the photosensitive elements that causes a reduction in the number of photons collected by each photosensitive element per unit of time, and thus worsens the signal-to-noise ratio and the dynamic range of the image. Under the low light, the effective image resolution may drop due to the elevated image noise that drowns small image details, and due to an increased motion blur caused by a longer exposure time required to compensate for the elevated image noise. There is a hard physical limit on size reduction of the photosensitive elements imposed by light diffraction that has been already reached by the current sensor technology.

The second approach leads to an exponential cost increase of the image sensor due to an exponential dependency between the physical dimensions of the focal plane array and the fabrication cost. The same exponential cost increase applies to the corresponding large-format lenses.

DETAILED DESCRIPTION

The detailed description set forth below in connection with the appended drawings is intended as a description of various embodiments of the disclosure and is not intended to represent the only forms in which the present disclosure may be constructed and/or utilized. The description sets forth the functions and the sequence of steps for constructing and implementing the illustrated embodiments. However, it is to be understood that the same or equivalent functions and sequences may be accomplished by different embodiments that are also intended to be encompassed within the spirit and scope of the disclosure.

As an alternative to the sensor resolution improvements discussed previously, employing post-acquisition computational methods may increase spatial resolution of the images post-capture. One of such methods is pan-sharpening, the fusion of at least two images acquired by at least two separate image sensors: a higher-resolution panchromatic image sensor and a lower-resolution multi-spectral sensor. As an example, the multi-spectral image sensor may include Bayer color filter array deposited on top of its focal plane array, as practiced in the art.

Pan-sharpening is generally considered as a global substitution of the luminosity component or an intensity component of the multi-spectral image with the higher-resolution panchromatic image. For the substitution to succeed, both images are fully matched in scale and the field of view, and perfectly registered to each other globally and locally, with no parallax present. These pan-sharpening techniques have been developed for and applied in aerial and space imaging where the distance from the focal plane to the objects in the field of view is essentially infinite, and where the panchromatic image and the multispectral image are acquired sequentially while flying over the same land surface area, thus eliminating the parallax problem, e.g., so that both fields of view (the panchromatic and the multi-spectral) are fully matched and perfectly registered to each other globally and locally.

Pan-sharpening methods may also allow a mismatch between the panchromatic and the multi-spectral images due to parallax. These methods may include additional means for resolving such a mismatch, for example, a light-projection-based depth-of-scene-estimation device integrated into the photographic image acquisition device. It may be evident to those skilled in the art that the task of pan-sharpening in the case of mismatched panchromatic and multi-spectral images is substantially complicated due to parallax and occlusions.

As yet another alternative to post-capture image resolution improvement, computational methods collectively known as super-resolution image reconstruction (or super-resolution for short) aim at reverting the effects of blurring in the lens and downsampling in the focal plane array. In contrast to pan-sharpening, super-resolution does not fuse a separately acquired higher-resolution image with a lower-resolution image. Instead, super-resolution exploits the intrinsic properties of the lower-resolution image itself.

Early attempts at computational super-resolution reconstruction relied on using the relative motion between the scene and the camera. By acquiring a sequence of multiple low-resolution images, each producing a generally different sub-pixel offset relative to the sampling grid of the image sensor due to motion, and then registering these multiple low-resolution images on a higher-resolution grid, attempts were made at reconstructing a single, super-resolved image. However, these methods required precise sub-pixel motion estimation, which is generally hard to achieve when non-global motion is present, especially under image noise. In the absence of relative motion between the scene and the camera, these techniques cannot produce any resolution improvement.

In a another computational approach to super-resolution, the desired sub-pixel offsets analogous to the sub-pixel offsets caused by the relative motion between the camera and the scene are found to exist in the low-resolution image itself due to a property of nonlocal self-similarity and redundancy at the scale of small image patches. In natural images, multiple similar or substantially similar image patches are typically present at different locations in the same image, where each patch includes a small group of pixels, e.g., a square of 9-by-9 pixels.

Because similar image patches at different image locations are a product of sampling similar areas of the scene by a finite-resolution sampling grid of the image sensor, the image patches generally include random, sub-pixel offsets relative to the grid, and thus provide additional sub-pixel resolution information. By using multiple similar patches found at different image locations, the effective resolution increase factor (up to a factor of three in each of the two image dimensions) may be achieved (corresponding to an increase of the effective pixel count by a factor of nine).

Further embodiments include patch-based, super-resolution methods that employ a database of examples of high-resolution images and their blurred and subsampled low-resolution copies (otherwise referred to herein as "example-based" methods). Such database of examples is utilized to extract a compact dictionary of pairs of low-resolution and high-resolution image patches using a variety of learning techniques. This dictionary of patch pairs may be made substantially compact due to the property of self-similarity and redundancy at the scale of small image patches. A low-resolution image may then be super-resolved using said dictionary of pairs.

In this example-based approach, the effective resolution increase factor may exceed that of the non-example based super-resolution approach, e.g., the approach based on sub-pixel sampling offsets. However, the super-resolved images may be less reliable in some applications because they are based on example-based predictions of what the high-resolution image might look like, as opposed to relying on the actual data present in the image itself.

Further embodiments include example-based, super-resolution methods based on previously discussed patch-pair dictionary learning, while the number of entries in the dictionary is substantially reduced. Such dictionaries are composed of elementary patch atoms, such that any small image patch is closely approximated by a linear sum of a very small subset of these atoms. The ability to approximate any image patch by a linear sum of a few elementary atoms is due to a fundamental property of sparsity of natural images in certain mathematical domains. The property of sparsity and the property of nonlocal self-similarity and redundancy at the patch scale are closely related. Sparse coding methods are known for having high computational cost due to the combinatorial nature of identifying the best combination of patch atoms that matches a given patch.

Further, similar image patches are found at different locations not only in the same image, but also in its downscaled copies created by blurring and subsampling of the image. This property of cross-scale nonlocal patch similarity is the basis of another example-based super-resolution method, which in contrast to the other example-based methods does not require an external database of high-resolution images or the dictionary of patch pairs. This cross-scale method first locates a pair of similar patches A and B in the actual image and its downscaled copy, and then applies the coordinates of patch B in the downscaled copy as a pointer to a corresponding location in the actual (non-downscaled) image to extract a higher-resolution patch C corresponding to the downscaled patch B, which may not generally coincide with the location of patch A. Higher-resolution patch C is further used in formation of a super-resolved image on a pixel-by-pixel basis by applying C at the same location in the super-resolved image as the location of patch A in the actual image.

Accordingly, the super-resolved image is formed using patches from locations in the actual image that are generally different from the "correct" locations in the unknown high-resolution image. However, due to the property of nonlocal self-similarity and redundancy at the scale of small patches, this substitution produces visually acceptable results. When this example-based method is combined with the method based on sub-pixel sampling offsets, the combined result is further improved in resolution.

In order to achieve a higher-scale resolution increase while avoiding image artifacts, the above technique may be applied over multiple iterations with a gradual increase in the cross-scale factor and using the intermediate results as a starting point for the next iteration. An additional step of back-projection of the newly formed high-resolution image onto the low-resolution image via blurring and subsampling may be referred to as a means for verification, regularization, and error avoidance.

In the example-based methods, the degree of match depends on the choice of the database of examples used in dictionary learning, and the choice of the scale gap between the high-resolution and the low-resolution image pairs in the database. The smaller the scale gap is, and the closer the database of examples is to the category of images to be super-resolved, the higher is the match between the super-resolved image and the unknown high-resolution image. In particular, increasing the effective pixel count by a factor of four may generally produce a close match between the reconstructed image and an unknown high-resolution image, while increasing the effective pixel count by a factor of sixteen or higher may not produce a meaningful result due to the predictive nature of the example-based methods.

Super-resolution image reconstruction, furthermore, involves not only the step of upsampling of the low-resolution image, but may also include a step of reversing the optical blur incurred in the process of the photographic acquisition of the low-resolution image. Reversing the blur employs an estimation of the point-spread function (PSF) of the imaging lens, which is generally unknown, but is typically assumed to have a Gaussian shape. Methods of blur kernel estimation may include, as an example, an approach based on inferring the blur kernel by maximizing the match between the low-resolution patches and their blurred and down-sampled higher-resolution matches found in the same image.

In various embodiments, post-capture computational super-resolution methods are computationally expensive. In particular, the amount of computational power that would be required to perform such computations in real-time during image acquisition (as opposed to post-capture) exceeds by orders of magnitude the computational power typically available in most cameras, including high-end cameras used in certain military applications. Moreover, even if the sufficient computational power were available for a real-time super-resolution reconstruction, the additional bandwidth to transmit the super-resolved images and the additional storage space to record them would be impractical in many applications.

Accordingly, example-based approaches to super-resolution are available, as well as various non-example-based ones that rely on sub-pixel offsets present in multiple similar image patches. At least one category of the example-based approaches relies on a database of high-resolution images and their blurred and subsampled low-resolution copies, while another relies on the examples found in the low-resolution image itself, with no external database used. The effective resolution increase factor may be lower in the non-example based methods relative to the example-based methods; however, the usage of the latter may be limited in some applications due to their predictive nature. In contrast to the super-resolution methods, the pan-sharpening methods rely on a separate higher-resolution image independently acquired by a panchromatic image sensor, but do not involve an increase of resolution beyond that of the panchromatic sensor.

While the embodiments disclosed herein may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the scope of the disclosure.

Figure 1:
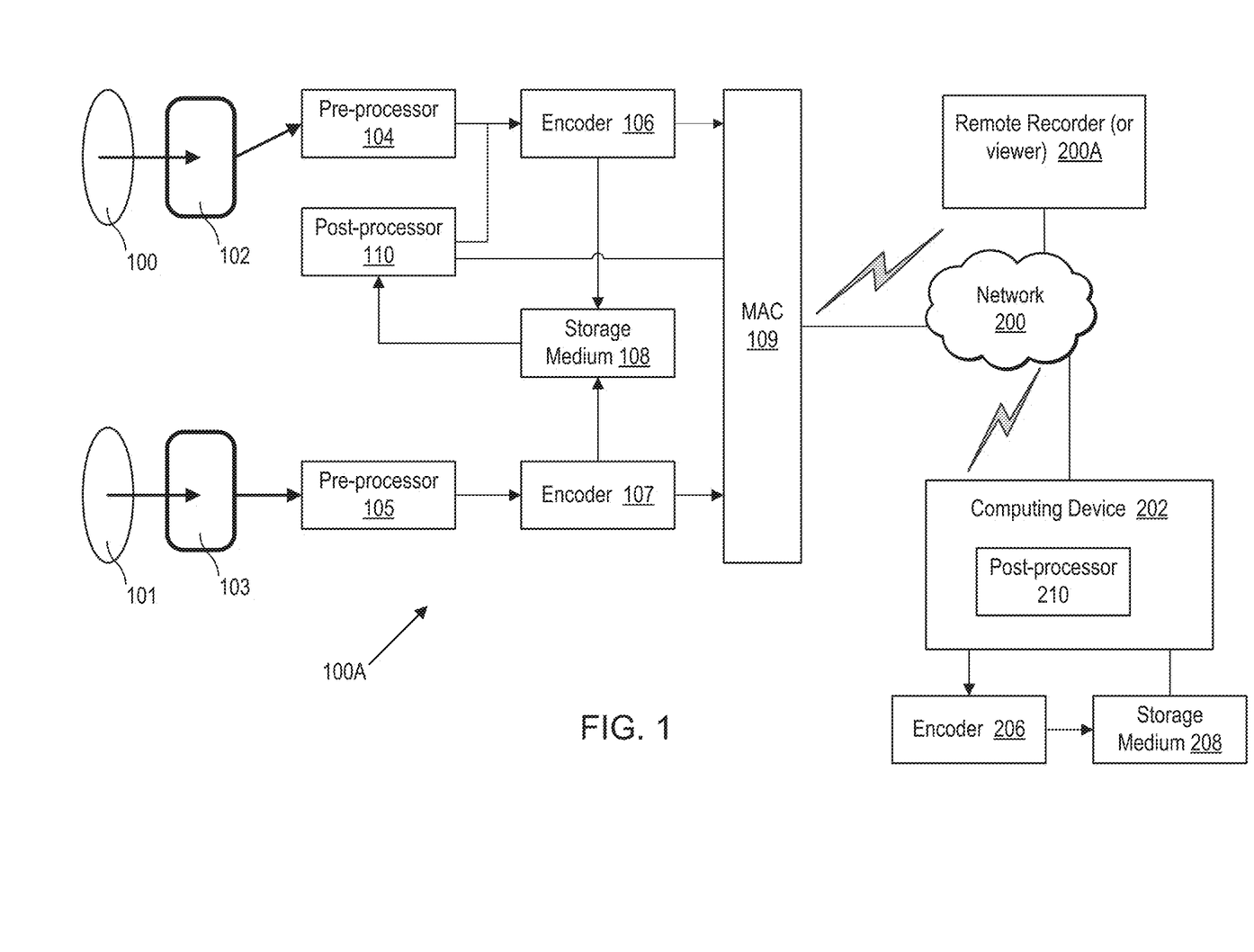
FIG. 1 is a diagram of a photographic image acquisition device in keeping with one embodiment of the present disclosure.

FIG. 1 is a block diagram of a photographic image acquisition device 100A according to one embodiment of the present disclosure. The photographic image acquisition device 100A may, for example, include a primary lens 100, a secondary lens 101, a primary image sensor 102, a secondary image sensor, one or more pre-processors 104 and 105, one or more encoders 106 and 107, a computer readable storage medium 108, and a media access controller (MAC) 109. The photographic image acquisition device 100A may be a distributed, networked system that communicates over a computer network 200, and which may further, or alternatively, include a remote recorder (or viewer) 200A. The photographic image acquisition device 100A may further include a computing device 202 having a post-processor 210 and that is operatively coupled to an encoder 206 and a storage medium 208 located remotely from photographic image acquisition device 100A, e.g., within a cloud computing system.

The primary lens 100 is optically coupled to the primary image sensor 102, a multi-spectral sensor, and the secondary lens 101 is optically coupled to the secondary image sensor 103, a panchromatic sensor. Images acquired by the primary sensor 102 are pre-processed by the pre-processor 104, and the images acquired by the secondary sensor 103 are pre-processed by the pre-processor 105. The pre-processing may include various processing steps, including pixel defect correction, color interpolation, noise filtering, unsharp masking, color correction, white balance control, gamma correction, tone mapping, color space conversion, as well as other image processing steps now known or later practiced in the art.

The images pre-processed by pre-processors 104 and 105 are encoded by encoder 106 and 107, respectively. The encoding may include image compression and encoding of the compressed images into one or more standard compression formats, such as H.264, H.265, JPEG, and the like. Encoded images are further recorded onto the storage medium 108, which may include an SD memory card, a hard disk drive, a solid state drive, or the like. Optionally, the encoded images are streamed over the computer network 200 or over other means of data transmission to the remote recorder (or viewer) 200A by the media access controller 109, and/or an Ethernet controller, a wireless network adapter, or the like means of data streaming over the computer network 200.

The recorded images are optionally retrieved from the storage medium 108 into the post-processor 110 for decoding and joint post-processing to produce super-resolved images. In one embodiment, only a small region of interest is retrieved from storage medium 108 and super-resolved by the post-processor 110, as opposed to the entire image at full field of view, to reduce processing power and computational requirements. The super-resolved images are further re-encoded by encoder 106 and optionally recorded onto storage medium 108 or streamed over the computer network 200 or over other means of data transmission to the remote recorder (or viewer) 200A by the media access controller 109.

In one embodiment, the encoded images are retrieved from the remote recorder 200A and streamed over the computer network 200 back to the disclosed photographic image acquisition device via the media access controller 109 to be decoded and post-processed by the post-processor 110, to produce a super-resolved image. In another embodiment, the joint post-processing of images to produce a super-resolved image is performed by the remote post-processor 210 that receives the encoded images from the image acquisition device 100A over the computer network via the media access controller 109 or the like means of data transmission.

Accordingly, the present disclosure provides the photographic image acquisition device 100A and methods thereof that raise the spatial resolution of the acquired images substantially beyond the individual capabilities of either the pan-sharpening approach or the super-resolution approach, and to advantageously produce a multiplicative effect on resolution increase unachievable by employing either of the two approaches separately. The multiplicative effect may be gained from the two previously mentioned components of the disclosure (the super-resolution reconstruction component and the pan-sharpening component) being made mutually interdependent through the property of nonlocal patch similarity and redundancy as will be explained in detail. For example, without the panchromatic image, the super-resolution of the multi-spectral image by itself cannot achieve a high scaling factor, while the pan-sharpening by itself cannot reach beyond the resolution of the panchromatic sensor.

The photographic image acquisition device 100A may also employ a pan-sharpening method that allows for a mismatch between the panchromatic and the multi-spectral images due to parallax without involving any additional hardware or methods for depth of scene estimation. In this way, the present disclosure also seeks to reduce the computational burden, bandwidth and storage space typically required in managing extreme resolution images and video.

In one embodiment, the optical axes of the primary lens 100 and the secondary lens 101 are set parallel to each other, and the primary image sensor 102 and secondary image sensor 103 are set in the same geometric plane, such that their focal plane arrays receive optical projections of the same scene. In one embodiment, the focal length of the primary lens 100 is shorter than that of the secondary lens 101, and in another embodiment, the primary lens 100 is a fisheye lens that projects an optically-warped image onto the focal plane of the primary image sensor 102.

Alternatively, or additionally, the image sensors include identical focal plane arrays of identical photosensitive elements, except that the primary sensor 102 is a multi-spectral image sensor, which may include a Bayer color filter array deposited on top of its focal plane array, while the secondary image sensor 103 (or sensors) may be panchromatic. The images from the primary multi-spectral image sensor (e.g., sensor 102) may be of a lower spatial resolution than the images from the secondary panchromatic image sensors (e.g., sensor(s) 103) due to spatial subdivision of the primary focal plane array into multiple overlapping spectral subcomponent arrays as determined by the Bayer array pattern.

The multi-spectral image sensor 102 may generally produce noisier images under limited illumination than the panchromatic image sensor 103 due to the color filter array impeding light propagation from the lens to the focal plane array, and an infrared cut filter that is typically installed in front of the multi-spectral image sensor to prevent the infrared content of the scene from contaminating the spectral subcomponents.

In another embodiment, the resolution of the focal plane array of the secondary (e.g., panchromatic) image sensor 103 is higher than that of the primary (or multi-spectral) image sensor 102. In one embodiment, the resolution of the primary image sensor 102 is further reduced due to a larger optical field of view as a consequence of a shorter focal length of the primary lens.

Additionally, or additionally, the pre-processing performed by the pre-processors 104 and 105 may include pixel defect correction, color interpolation, noise filtering, unsharp masking, color correction, white balance control, gamma correction, tone mapping, color space conversion, as well as other steps now known or latter practiced in the art. The encoding by the encoders 106, 107 and/or 206 may include image compression and encoding of compressed images into one or more standard compression formats, such as H.264, H.265, JPEG, and the like. The storage medium 108 or 208 may include an SD memory card, a hard disk drive, a solid state drive, or the like. The means for streaming the encoded images over the computer network 200 may include an Ethernet transceiver, a Wi-Fi transceiver (e.g., based on the Wi-Fi™ standard of the Wi-Fi Alliance), and the like.

In one embodiment, the secondary image sensor 103 captures images at a different frame rate than the primary image sensor 102, or with a shorter exposure time, so that the scene content is further mismatched. One embodiment also includes computational means (such as will be discussed) for decoding the recorded images acquired by the primary and the secondary image sensors, and a joint post-processing reconstruction of the super-resolved images from the images acquired by the primary and the secondary image sensors, the super-resolved images further re-encoded, and recorded onto the storage medium 108, or optionally streamed to the remote recorder (or viewer) 200A over a computer network or via other means of data transmission.

Additionally, or alternatively, the decoding of the recorded images and joint post-processing reconstruction of the super-resolved images is performed by the remote post-processor 210. The remote post-processor 210, as an example, may be located within the computing device 202 (such as a computer or server) connected to a local area network as the photographic image acquisition device 100A. The remote post-processor 210 may receive the images from the computing device 202, or a computer connected to a wide area network, or a specialized post-processor connected to the local or wide area network, or a post-processor connected directly to the disclosed image acquisition device, or the like.

In one embodiment, the post-processing reconstruction of the super-resolved images is limited to a small, zoomed region of interest, as opposed to the entire recorded image at full field of view, to advantageously reduce the computational cost, bandwidth and storage space required for the super-resolved image. In such an embodiment, the joint post-processing reconstruction of the super-resolved images includes a method of resolution increase involving fusion of the panchromatic and the multi-spectral images with a concurrent super-resolution reconstruction thereof, both the fusion and the super-resolution reconstruction exploiting nonlocal self-similarity and redundancy at the scale of small image patches.

The disclosed method of resolution increase may advantageously allow a mismatch between the two images due to parallax. The disclosed method may further exploit a larger difference in the fields of view when the focal length of the primary imaging lens 100 is shorter than that of the secondary lens 101. Additionally, or alternatively, the method may further exploit a larger difference in image content when the frame rates or exposure times of the two image sensors are not identical, or when the panchromatic images are acquired asynchronously to the multi-spectral images.

Figure 5:
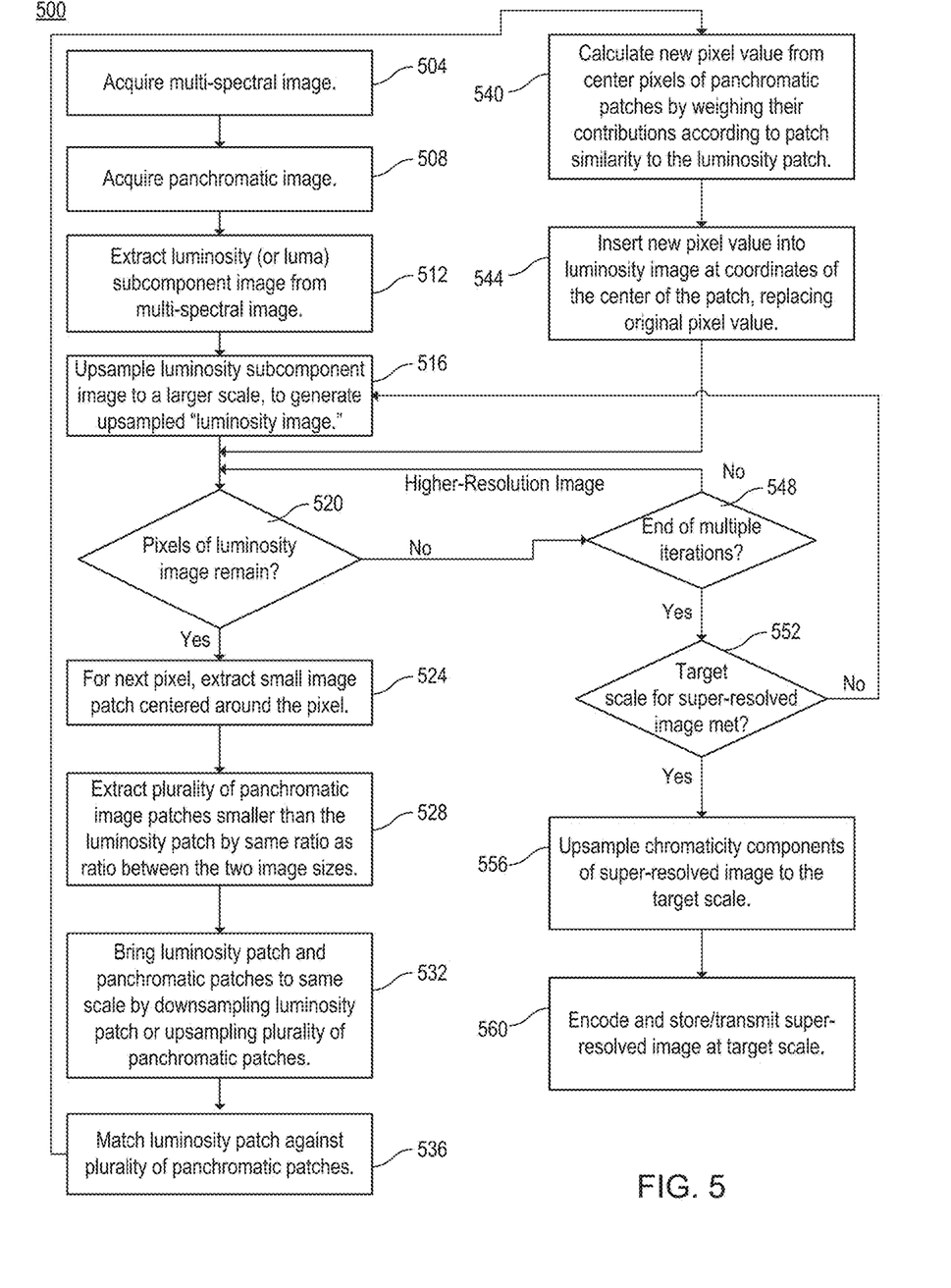
FIG. 5 is a flow chart illustrating one embodiment of an iterative method for super-resolution image reconstruction according to an embodiment of the present disclosure.

FIG. 5 is a flow chart illustrating one embodiment of an iterative method 500 for super-resolution image reconstruction according to an embodiment of the present disclosure. The method 500 may be performed by the image acquisition device 100A, the remote recorder (or viewer) 200A, the computing device 202 and post-processor 210, or a combination thereof. For example, the computational processing may be performed across the network 200 in a cloud server or the like upon receipt of input images to be processed.

With reference to FIG. 5, the method 500 of resolution increase may include a plurality of steps grouped into a first general step, a second general step, and a third general step that are computing steps taken to enhance resolution of an image captured by both the primary image sensor 102 and the secondary image sensor 103. The method 500 may begin by acquiring a multi-spectral image of a scene with a multi-spectral image sensor (504). The method 500 may continue by acquiring a panchromatic image of the scene with a panchromatic sensor (508).

The first general step may be to generate an initial crude estimate of an intended super-resolved image computed by the post-processor 110 or 210 or by extracting a luminosity subcomponent image from the multi-spectral image (512).

The method 500 may continue by upsampling the luminosity subcomponent image to bring it up to an intended scale of the super-resolved image, to generate a "luminosity image" that is upsampled by one or more interpolation techniques (516). In one embodiment, the upsampling is via Lanczos interpolation or a similar interpolation technique such as, for example, the bi-cubic interpolation, to generate the luminosity image. In one embodiment, luminosity pixel values may be extracted from the multi-spectral image by a weighted mixture of red/green/blue (RGB) subcomponent pixel values at known ratios, for example, at approximately 60% of green, 30% of red, and 10% of blue. Luminosity pixel values may be substituted in one embodiment with luma values that are extracted similarly except for the gamma correction of the RGB components.

During the second general step of the method of resolution increase, a series of patch extraction and patch processing may be performed to generate a new super-resolved image of higher-resolution. For example, the method 500 may continue with determining whether at least one pixel still remains within the luminosity image to be processed (520), and as will be seen later, this luminosity image may be a new, higher-resolution version of the luminosity image. If there is not, and all the pixels have been processed, the method may continue to block 548, to determine whether all iterations on the higher-resolution version of the luminosity image have been performed (discussed later). If yes, there is still at least one more pixel to process in the luminosity image, the method 500 may extract a small image patch centered the pixel (524). The method may continue by extracting a plurality of panchromatic image patches that are smaller than the luminosity patch by substantially the same ratio as the ratio between the two image sizes (e.g., the size of the panchromatic image and the size of the luminosity subcomponent image) (528).

With continued reference to FIG. 5, the method may continue by bringing the luminosity patch and the panchromatic patches to the same scale by either downsampling the luminosity patch or upsampling the panchromatic patch accordingly (532). Upsampling of the plurality panchromatic patches to the scale of the luminosity patch or an alternative downsampling of the luminosity patch to the scale of panchromatic patches can be performed in a variety of ways. For example, the upsampling of the plurality of panchromatic patches may be performed via Lanczos interpolation or a similar interpolation technique such as, for example, the bi-cubic interpolation. In one embodiment, the scale ratio is an integer value, for example two ("2"), and the downsampling of the luminosity patch may involve calculating each pixel value of the downsampled patch by averaging values of four neighbor pixel values of the non-downsampled image by a 2-by-2 neighborhood, for example. In some embodiments where the scale ratio is non-integer, downsampling may involve calculating each pixel value of the downsampled luminosity patch by weighing the values of pixels surrounding the pixel in the non-downsampled image in proportion to their geometric proximity to the nodes of the pixel grid of the downsampled image.

In some embodiments, the plurality of panchromatic patches may contain patches extracted from the panchromatic image rotated at a plurality of different angles in the image plane relative to the luminosity image, or may contain patches extracted from the panchromatic image scaled at a plurality of different scale ratios relative to the upsampled luminosity image scale.

The method 500 may continue by matching the scaled luminosity patch against the plurality of panchromatic patches using a measure of patch similarity, such as the Euclidian distance between the patches, or another similarity metric (536). In one embodiment, the luminosity patch may be processed using a pre-trained neural network to improve signal-to-noise ratio and resolution, and to reduce blurring, prior to matching the patch with each of the plurality of the panchromatic patches. In this or other embodiments, the luminosity patch may be processed using the pre-trained neural network to improve the similarity between the luminosity patch and the panchromatic patches using pairs of low and high resolution patches.

The method 500 may then continue by calculating a new pixel value from multiple pixel values at the centers of the panchromatic image patches by weighing relative contributions of the plurality of panchromatic image patches in proportion to their respective similarity to the luminosity patch (540). The method 500 may continue by inserting the new pixel value into the luminosity image at the coordinates corresponding to a center of the interpolated luminosity patch, to replace the original pixel value (544). In some embodiments, the measure of patch similarity may involve local gradients of the first, second, and optionally higher orders.

The method 500 may continue within the general second step by iterating over the pixels of the luminosity image to gradually replace all of its pixels, to form a new higher-resolution image as an improved estimate of the intended super-resolved image in place of the initial crude estimate made prior to the second general step (520). The method 500 may continue within the second general step by performing further iteration(s) over the entire image, e.g., from block 520 through block 544, but by processing the new higher-resolution image (548). In other words, each iteration forms a new higher-resolution image (e.g., enhanced version of the luminosity image) as an improved estimate of the intended super-resolved image in place of the higher-resolution image formed at the previous iteration. To obtain a super-resolved image, the number of iterations may be at least two in one embodiment.

The method 500 may continue (in a third general step) to determine whether a target scale for the super-resolved image has been met (552). If yes, the target scale has been met, the method may continue with upsampling chromaticity components of the multi-spectral, super-resolved image to the target scale before performing the steps of block 560 (556). If no, the target scale for the super-resolved image has not been met, the method may loop back to block 516, to upsample the super-resolved image to the larger (target) scale (516). Once the super-resolved image and the chromaticity components of the super-resolved image are at the target scale, the method may continue with encoding and storing (or transmitting) the super-resolved image at the target scale (560).

In one embodiment, each of the iterations (block 548) may additionally involve a reversal of optical blur applied to each of the newly obtained estimates of the intended super-resolved image. The point-spread function (PSF) of the imaging lens, also known as the blur kernel, is generally unknown, but may be assumed to have a Gaussian shape. In one embodiment, the blur kernel is estimated using a calibration procedure employing acquisition of a test image by the photographic image acquisition device 100A or the remote recorder 200A at two different distances corresponding to the ratio of the super-resolved image and the low-resolution image. An external computing device such as the remote recorder 200A may then minimize the difference between the images by applying the blur kernel to the higher-resolution test image, downsampling the resultant processed image, and iteratively modifying the kernel weights. The minimization in the present embodiment may include the least squares method or the like.

In one embodiment, the plurality of panchromatic patches extracted in the second general step is extracted not only from a given panchromatic image, but also from multiple temporally proximal panchromatic images (e.g., video frames) acquired shortly before and after the currently-processed image. In one embodiment, due to the substantial similarity between the two fields of view, the luminosity image field of view and the panchromatic image field of view, the area of the panchromatic image for extracting the plurality of the panchromatic patches is limited to a close geometric proximity of a given luminosity image patch. In another embodiment, the extraction of the panchromatic patches is done at random, followed by a subsequent additional patch extraction near the most similar patches found initially, where the sequence is iterated multiple times until a sufficient number of similar patches are found.

As discussed, the third general step of the disclosed hybrid method is performed after the multiple iterations (548) are completed, and includes the upsampling of the chromaticity subcomponent images of the multi-spectral image to the scale of the super-resolved luminosity image via Lanczos interpolation or a similar interpolation technique such as, for example, the bi-cubic interpolation (556). Although the spatial resolution of the chromaticity subcomponents attained via interpolation is not increased, the resolution is not critical for visual perception of small image details of the super-resolved image as long as its luminosity subcomponent is super-resolved.

To avoid any color drift as a result of the substitution of the original luminosity pixel values with the generally different panchromatic values, the chromaticity subcomponent pixel values of the multi-spectral image may be further adjusted. In one embodiment, the adjustment of chromaticity values is performed prior to interpolation of the chromaticity subcomponent images by first down-sampling the super-resolved luminosity image to the scale of the chromaticity images and then adjusting the chromaticity at that scale.

In one embodiment, an additional optical blur reversal is performed on the chromaticity components using a default blur kernel as a generic model of the optical blur, for example, a Gaussian-shaped default kernel, or an estimated kernel from the blur kernel estimation procedure as previously discussed.

Note that the degree of patch similarity between the two images, e.g., the panchromatic and the multi-spectral images, in the disclosed embodiment is generally higher than the degree of similarity with patches extracted from an external database of example images. This is the case because both image sensors of the disclosed image acquisition device capture a substantially-similar scene content under the identical illumination conditions, and because both images are similarly pre-processed and encoded as disclosed.

In one embodiment, and with reference to FIG. 1, where the primary lens 100 is a fisheye lens that projects an optically warped image onto the focal plane of the primary image sensor, the similarity at the patch level is still high if the fisheye lens produces a conformal stereographic projection, after adjusting for local rotation and scaling factor for each patch.

In one embodiment, the secondary image sensor 103 coupled to the secondary lens is mounted on a motorized pan-and-tilt mechanism to acquire multiple images throughout a larger field of view of the primary image sensor 102, where the acquisition is performed at a substantially slower frame rate than the frame rate of the primary sensor 102. In yet another embodiment, the secondary lens 101 is a motorized varifocal or a motorized parfocal lens to allow changes of the field of view and the corresponding resolution of the resultant images.

Unlike pan-sharpening methods, disclosed image fusion is no longer treated as a global substitution of the luminosity or intensity of the multi-spectral image with the higher-resolution panchromatic image. For such substitution to succeed, both images have to be fully matched in scale and the field of view, perfectly registered to each other globally and locally, with no parallax present. In contrast, the present disclosure employs nonlocal self-similarity and redundancy at the patch level, and thus does not depend on a perfect global and local correspondence between the images, and eliminates any no-parallax requirements.

Further, the disclosed methods include super-resolution image reconstruction performed concurrently with image pan-sharpening to achieve a large multiplicative resolution increase factor. This multiplicative effect is gained because the super-resolution reconstruction component and the pan-sharpening component are made mutually interdependent through the property of nonlocal patch similarity and redundancy: without the panchromatic image, the super-resolution of the multi-spectral image by itself cannot achieve a high scaling factor, while the pan-sharpening by itself cannot reach beyond the resolution of the panchromatic sensor. As an illustrative example, assume the multi-spectral sensor 102 and the panchromatic sensor 103 include identical arrays of photosensitive elements where the multi-spectral sensor 102 includes a Bayer color filter. Further assume the effective computational, super-resolution factor relative to the panchromatic image resolution is two in each dimension. In this case, the multiplicative factor of the disclosed method is 3.5 in each dimension, or an effective increase in image pixel density of over 12.

Certain embodiments of the disclosure may be used for video surveillance systems, including land-based, vehicle-based, and airborne surveillance. Such systems may be employed to aid in the imaging and detection of facial features, lettering, manmade versus natural phenomena, and more. The systems may be a low-cost, low-weight, small-sized payload camera, while the remote post-processor 210 may be employed to produce the computationally super-resolved images that are similar or superior in image resolution as previously achievable only in high-cost, heavy-weight, larger-size video capture systems.

Figure 2A:
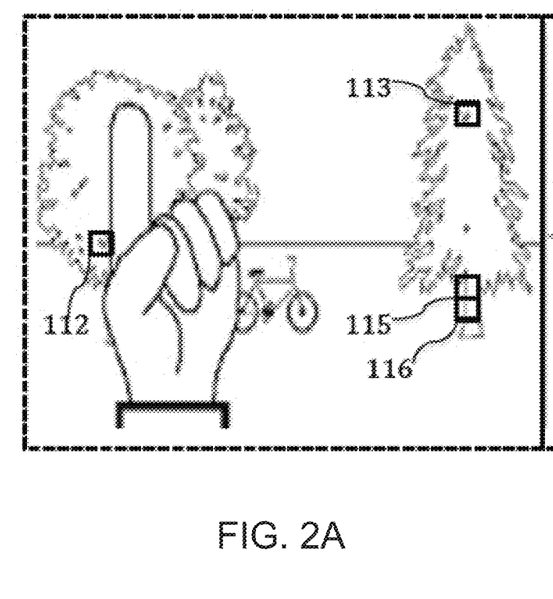
FIG. 2A is a depiction of an example panchromatic image according to an embodiment of the present disclosure.
Figure 2B:
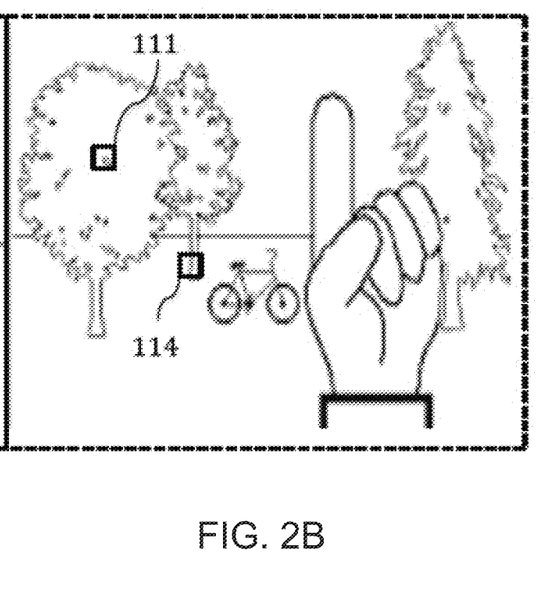
FIG. 2B is a depiction of an example luminosity component of a multi-spectral image according to an embodiment of the present disclosure illustrating a mismatch with the panchromatic image due to parallax.

FIGS. 2A and 2B are illustrations of two images acquired by the disclosed photographic image acquisition device 100A. FIG. 2A illustrates a panchromatic image and FIG. 2B illustrates a luminosity component of a multi-spectral image at the same scale as the panchromatic image. Note that the panchromatic image of FIG. 2A does not perfectly match the luminosity image of FIG. 2B due to parallax. A small image patch 111 in the luminosity image of FIG. 2B is occluded in the panchromatic image due to parallax; however, there are multiple similar patches 112 and 113 found in the panchromatic image that are used in fusion and super-resolution reconstruction as disclosed with reference to FIG. 5. Additionally, an image patch 114 in the luminosity image of FIG. 2B is occluded in the panchromatic image of FIG. 2A due to parallax; however, there are multiple similar patches 115 and 116 found in the panchromatic image that are used in fusion and super-resolution reconstruction as disclosed with reference to FIG. 5. The scale relationship between the size of small image patches and the entire field of view depicted in FIGS. 2A and 2B is overstated for illustration purposes, and is not representative of the actual scale relationship.

Figure 3A:
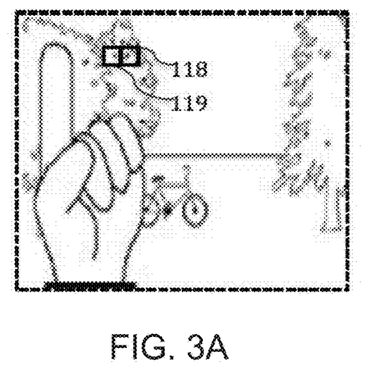
FIG. 3A is a depiction of an example panchromatic image according to an embodiment of the present disclosure.
Figure 3B:
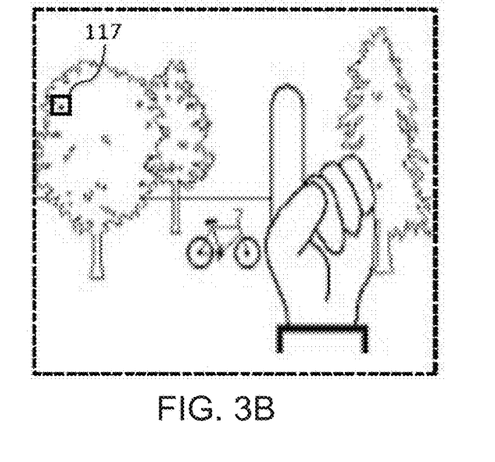
FIG. 3B is a depiction of a luminosity component of a multi-spectral image within a larger field of view than the panchromatic image of FIG. 3A, according to one embodiment of the present disclosure.

FIG. 3A is a depiction of an example panchromatic image according to an embodiment of the present disclosure. FIG. 3B is a depiction of a luminosity component of a multi-spectral image within a larger field of view than the panchromatic image of FIG. 3A, according to one embodiment of the present disclosure. Patch 117 in the luminosity image has no corresponding region in the panchromatic image due to the difference in the fields of view; however, there are multiple similar patches 118 and 119 found in the panchromatic image that are used in fusion and super-resolution reconstruction as disclosed with reference to FIG. 5. The scale relationship between the size of small image patches and the entire field of view depicted in FIGS. 3A and 3B is overstated for illustration purposes, and is not representative of the actual scale relationship.

Figure 4A:
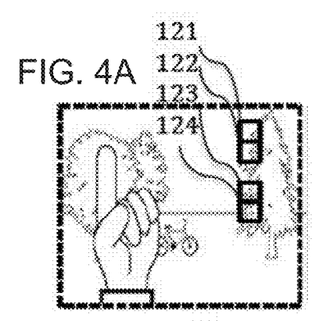
FIG. 4A is a depiction of another example panchromatic image of a scene according to an embodiment of the present disclosure.
Figure 4B:
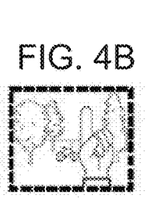
FIG. 4B is a depiction of another example of a luminosity subcomponent image of a multi-spectral image of the scene (according to effective pixel count) that is four times smaller than the panchromatic image of FIG. 4A.
Figure 4C:
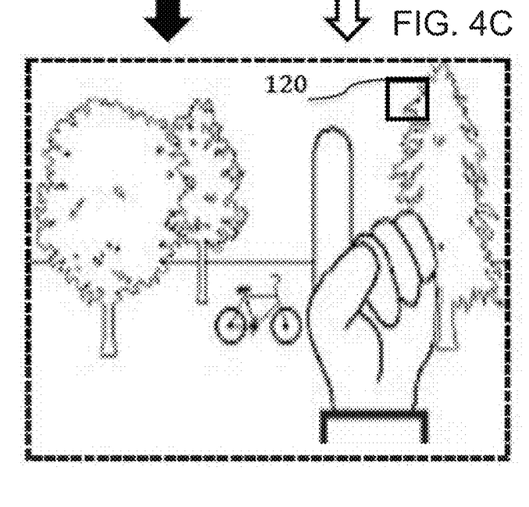
FIG. 4C is a depiction of a super-resolved image derived from super-resolution image reconstruction of the panchromatic image of FIG. 4A and the luminosity subcomponent image of FIG. 4B, according to one embodiment of the present disclosure.

FIG. 4A is a depiction of another example panchromatic image of a scene according to an embodiment of the present disclosure. FIG. 4B is a depiction of another example of a luminosity subcomponent image of a multi-spectral image of the scene (according to effective pixel count) that is four times smaller than the panchromatic image of FIG. 4A. FIG. 4C is a derived from super-resolution image reconstruction of the panchromatic image of FIG. 4A and the luminosity subcomponent image of FIG. 4B, according to one embodiment of the present disclosure.

The white arrow between FIG. 4B and FIG. 4C represents the upsampling of the low-resolution luminosity subcomponent image of the multi-spectral image to the intended scale of the super-resolved image by Lanczos interpolation, or by another interpolation technique such as, for example, the bi-cubic interpolation. This upsampling may be an initial crude estimate of the intended super-resolved image at the target scale. The black arrow between FIGS. 4A and 4C represents the super-resolution reconstruction of the interpolated luminosity image using nonlocal similarity and redundancy of small image patches in the panchromatic image and the interpolated luminosity image.

The scale relationships between images depicted in FIGS. 4A and 4B represent the difference in effective pixel count relative to the field of view. The luminosity subcomponent image shown in FIG. 4B is illustrated approximately four times smaller than the panchromatic image of FIG. 4A to reflect the scenario in one embodiment where both image sensors include an identical array of photosensitive elements while the multi-spectral image sensor includes the Bayer color filter array that reduces its effective pixel count relative to the panchromatic sensor by an approximate factor of at least 1.75 in each dimension due to color interpolation.

A patch 120 lies within the interpolated luminosity image (shown in FIG. 4C) and a plurality of similar patches 121, 122, 123, 124 lies within the panchromatic image of FIG. 4A that are approximately four times smaller than patch 120. The scale relationship between the size of small image patches and the entire field of view depicted in FIGS. 4A through 4C is overstated for illustration purposes, and is not representative of the actual scale relationship.

Also shown in FIG. 4C is the final super-resolved image with a super-resolution factor of approximately four (two in each dimension) relative to the panchromatic image of FIG. 4A. The resolution increase by approximately a factor of four by employing nonlocal patch similarity and redundancy is feasible under a variety of conditions. Resolution increase by approximately a factor of four relative to the panchromatic image as shown in FIG. 4A corresponds to an approximate factor of twelve relative to the luminosity image, and the multi-spectral image itself. Said resolution increase factor may be achievable by the present disclosure as disclosed heretofore; however, the range of said resolution increase may be limited by the signal-to-noise-ratio of the image, the scene content, and other variables, known to those skilled in the art.

Another embodiment of the present disclosure includes a similar iterative method directed to parallax compensation in photographic multi-aperture image acquisition systems. This embodiment may employ a primary aperture and one or more secondary apertures optically projecting substantially the same scene onto the primary and secondary digital image sensors 102 and 103. These apertures may be identical or non-identical in regards to their F-stop number, the lenses being identical or non-identical in regards to their focal length. (The F-stop number is the ratio of focal length to the diameter of the entrance of the pupil, and a quantitative measure of lens speed.) Furthermore, the image sensors 102 and 103 may be identical or non-identical in regards to their resolution, spectral characteristics, or sensitivity.

The parallax compensation may be needed where, for example, the data from the sensors 102 and 103 are used to produce an enhancement of one or more of image characteristics of the primary image, such as potentially its resolution, dynamic range, signal-to-noise ratio, color, or low-light performance, which is achieved via fusion of the primary aperture image with the secondary aperture image or images.

This further embodiment may then include the steps discussed with reference to FIG. 5, such as extracting an image patch surrounding each pixel of the primary aperture image and extracting a plurality of image patches from the secondary aperture image or images. Each patch of the plurality of secondary aperture image patches may then be matched against the primary aperture image patch using a measure of patch similarity, and a new pixel value may be calculated from multiple pixel values at the centers of the secondary aperture image patches by weighing their relative contributions in proportion to their similarity to the primary aperture image patch. The new pixel value may then be inserted into the primary aperture image at the coordinates corresponding to the center of the primary aperture image patch thereby replacing the original pixel value at these coordinates.

In this embodiment, the above-described process may be iterated over all pixels of the primary aperture image to gradually replace all of its pixels to form an enhanced fused image in place of the initial primary aperture image. Once the process is iterated over all pixels of the primary aperture image, the process may be repeated one or more times over the entire primary image, using the previous iteration resultant image as the new starting point for the next iteration, where each iteration forms an improved fused image in place of the image formed at the previous iteration.

The iterations may employ a regularization step using Total Variation regularization or alternatively Tikhonov regularization. The iterations may additionally employ a reversal of optical blur applied to the newly obtained fused image. Optionally, the plurality of secondary aperture image patches may be extracted not only from a given secondary aperture image, but also from multiple temporally proximal images (video frames) acquired shortly before and/or shortly after the given image.

Moreover, the fusion of the primary and secondary aperture image or images may advantageously exploit nonlocal self-similarity and redundancy at the scale of small image patches between the primary and the secondary images, as discussed above with respect to other embodiments, thereby advantageously exploiting mismatches between the images due to parallax, and advantageously eliminating the requirement of global or local registration of the images.

While the present disclosure has been described with regards to particular embodiments, it is recognized that additional variations of the present disclosure may be devised without departing from the inventive concept. The foregoing description of the various embodiments of the disclosure has been presented for the purposes of illustration and description. It is not intended to be exhaustive or to limit the disclosure to the precise form disclosed. Many modifications and variations are possible in light of the above teaching. It is intended that the scope of the disclosure not be limited by this detailed description, but by the claims and the equivalents to the claims appended hereto.

What is claimed is:

1. An apparatus comprising:
    computer storage comprising a computer-readable storage medium; and
    a processing device operatively coupled to the computer storage and to reconstruct spatial resolution of an image of a scene captured within a multi-spectral image and a panchromatic image, the multi-spectral image obtained from a multi-spectral image sensor having a color filter array and positioned at a first optical axis, and the panchromatic image obtained from a panchromatic sensor positioned at a second optical axis that is substantially parallel to the first optical axis;
    wherein, to reconstruct the spatial resolution of the image, the processing device is to:
        extract a luminosity subcomponent image from the multi-spectral image;
        upsample the luminosity subcomponent image to an intended scale of a super-resolved image to be produced, to generate a luminosity image;
        for each pixel of a plurality of pixels of the luminosity image, to produce the super-resolved image:
            extract a first image patch surrounding the pixel;
            extract a plurality of second image patches from the panchromatic image such that the plurality of second image patches are each smaller than the first image patch by a ratio of a size of the panchromatic image to a size of the luminosity image;
            upsample the plurality of second image patches to a scale of the luminosity image, to generate a plurality of upsampled second image patches;
            match each patch of the plurality of upsampled second image patches to the first image patch; and
            replace a value of the pixel of the luminosity image with a new pixel value taken from a central pixel of an upsampled second image patch of the plurality of upsampled second images patches that most closely matches the first image patch; and
        store, in the computer storage, the super-resolved image as a replacement of the image.

2. The apparatus of claim 1, wherein the processing device is further to replace the luminosity image with the super-resolved image, and wherein, for each pixel of a plurality of pixels of the super-resolved image, to reconstruct a further super-resolved image of the scene, the processing device is further to:
    extract a third image patch surrounding the pixel;
    extract a plurality of fourth image patches from the panchromatic image such that the plurality of fourth image patches are each smaller than the third image patch by a ratio of a size of the panchromatic image to a size of the super-resolved image;
    upsample the plurality of fourth image patches to a scale of the super-resolved image, to generate a plurality of upsampled fourth image patches;
    match each patch of the plurality of upsampled fourth image patches to the third image patch; and
    replace a value of the pixel of the super-resolved image with a new pixel value taken from a central pixel of an upsampled fourth image patch most closely matching the third image patch.

3. The apparatus of claim 2, wherein the luminosity image is an initial estimate of the super-resolved image, and wherein the processing device is to perform additional processing iterations to produce at least a second further super-resolved image of the scene.

4. The apparatus of claim 1, wherein the processing device is further to calculate the new pixel value by weighing relative contributions of values of central pixels of respective plurality of upsampled second image patches in proportion to a similarity of each respective upsampled second image patch to the first image patch.

5. The apparatus of claim 1, wherein the processing device is further to apply regularization processing to the super-resolved image.

6. The apparatus of claim 1, wherein the multi-spectral image sensor is optically coupled to a first imaging lens, the panchromatic sensor is optically coupled to a second imaging lens, and wherein a focal length of the first imaging lens is shorter than a focal length of the second imaging lens.

7. The apparatus of claim 1, wherein the multi-spectral image sensor and the panchromatic sensor have substantially identical focal plane arrays of substantially identical photosensitive elements, and wherein the multi-spectral image sensor and the panchromatic sensor are set in substantially a single geometric plane such that the focal plane arrays receive optical projections of substantially an identical version of the scene.

8. The apparatus of claim 1, wherein the multi-spectral image is captured at a first frame rate and the panchromatic image is captured at a second frame rate different than the first frame rate.

9. The apparatus of claim 1, wherein the processing device is further to confine selection of the plurality of second image patches to extract to an area of the panchromatic image that corresponds, in geometric proximity, to a location of the first image patch in the luminosity image.

10. The apparatus of claim 1, wherein, to extract the plurality of second image patches, the processing device is further to iteratively:
    select, pseudo-randomly, an image patch from the panchromatic image;
    compare the image patch to the first image patch for similarity; and
    select another image patch near the image patch responsive to the image patch being within a threshold level of similarity to the first image patch.

11. The apparatus of claim 1, wherein the processing device is further to, during extraction of the plurality of second image patches, cause the panchromatic image to rotate relative to the luminosity image.

12. The apparatus of claim 1, wherein the processing device is further to:
upsample a chromaticity subcomponent image of the multi-spectral image to the intended scale of the super-resolved image; and
adjust pixel values of the chromaticity subcomponent image to avoid color drift.

13. A method comprising:
receiving, from an image acquisition device by an image processing device, a multi-spectral image and a panchromatic image both taken of a scene, the multi-spectral image obtained from a multi-spectral image sensor having a color filter array and positioned at a first optical axis, and the panchromatic image obtained from a panchromatic sensor positioned at a second optical axis that converges at an angle with the first optical axis;
extracting, by the image processing device, a luminosity subcomponent image from the multi-spectral image;
upsampling, by the image processing device, the luminosity subcomponent image to an intended scale of a super-resolved image to be produced, to generate a luminosity image;
for each pixel of a plurality of pixels of the luminosity image, to produce the super-resolved image, the image processing device:
extracting a first image patch surrounding the pixel;
extracting a plurality of second image patches from the panchromatic image such that the plurality of second image patches are each smaller than the first image patch by a ratio of a size of the panchromatic image to a size of the luminosity image;
downsampling the first image patch to a scale of the plurality of second image patches, to generate a downsampled first image patch;
matching each patch of the plurality of second image patches to the downsampled first image patch; and
replacing a value of the pixel of the luminosity image with a new pixel value taken from a central pixel of a second image patch of the plurality of second image patches that most closely matches the downsampled first image patch; and
storing, in a computer storage of the image processing device, the super-resolved image as a replacement to the luminosity image.

14. The method of claim 13, further comprising, by the image processing device and for each pixel of a plurality of pixels of the super-resolved image, to reconstruct a further super-resolved image of the scene:
extracting a third image patch surrounding the pixel;
extracting a plurality of fourth image patches from the panchromatic image such that the plurality of fourth image patches are each smaller than the third image patch by a ratio of a size of the panchromatic image to a size of the super-resolved image;
downsampling the third image patch to a scale of the plurality of fourth image patches, to generate a downsampled third image patch;
matching each patch of the plurality of fourth image patches to the downsampled third image patch; and
replacing a value of the pixel of the super-resolved image with a new pixel value taken from a central pixel of a fourth image patch most closely matching the downsampled third image patch.

15. The method of claim 14, wherein the luminosity image is an initial estimate of the super-resolved image, the method further comprising performing additional processing iterations to produce at least a second further super-resolved image of the scene.

16. The method of claim 13, further comprising calculating the new pixel value by weighing relative contributions of values of central pixels of respective plurality of second image patches in proportion to a similarity of each respective second image patch to the downsampled first image patch.

17. The method of claim 13, further comprising applying regularization processing to the super-resolved image.

18. The method of claim 13, further comprising:
capturing the multi-spectral image with a first exposure time; and
capturing the panchromatic image with a second exposure time different than the first exposure time.

19. The method of claim 13, further comprising confining selection of the plurality of second image patches for extracting to an area of the panchromatic image that corresponds, in geometric proximity, to a location of the first image patch in the luminosity image.

20. The method of claim 13, wherein extracting the plurality of second image patches further comprises iteratively:
selecting, pseudo-randomly, an image patch from the panchromatic image;
comparing the image patch to the first image patch for similarity; and
selecting another image patch near the image patch responsive to the image patch being within a threshold level of similarity to the first image patch.

21. The method of claim 13, wherein extracting the plurality of second image patches further comprises rotating the panchromatic image relative to the luminosity image between extractions of respective second image patches.

22. The method of claim 13, further comprising:
upsampling a chromaticity subcomponent image of the multi-spectral image to the intended scale of the super-resolved image; and
adjust pixel values of the chromaticity subcomponent image to avoid color drift.

23. A non-transitory, computer-readable medium storing instructions, which when executed by an image processing device, cause the image processing device to perform a plurality of operations comprising:
receiving, from a multi-aperture image acquisition device by the image processing device, a first image of a scene projected through a first aperture onto a first digital image sensor and a second image of the scene projected through one or more second aperture onto one or more second digital image sensor;
fusing the second image with the first image, by the image processing device, to generate an output image that compensates for parallax between the first image and the second image, wherein fusing comprises, for each pixel of a subcomponent image of the first image:
extracting a first image patch surrounding the pixel;
extracting a plurality of second image patches from the second image;
matching each of the plurality of second image patches to the first image patch; and
replacing a value of the pixel with a new pixel value taken from a central pixel of a second image patch of the plurality of second image patches that most closely matches the first image patch; and storing, in a computer storage of the image processing device, the output image as a replacement to the first image.

24. The non-transitory, computer-readable medium of claim 23, wherein the plurality of operations further comprise iteratively performing the extracting, the matching, and the replacing on the output image to generate at least a second output image of higher-resolution than the output image.

25. The non-transitory, computer-readable medium of claim 23, wherein the plurality of operations further comprise calculating the new pixel value by weighing relative contributions of values of central pixels of respective plurality of second image patches in proportion to a similarity of each respective second image patch to the first image patch.

26. The non-transitory, computer-readable medium of claim 23, wherein extracting the plurality of second image patches further comprises iteratively:

selecting, pseudo-randomly, an image patch from the second image;

comparing the image patch to the first image patch for similarity; and selecting another image patch near the image patch responsive to the image patch being within a threshold level of similarity to the first image patch.

27. The non-transitory, computer-readable medium of claim 23, wherein the subcomponent image comprises one of a luminosity image, a chromaticity image, or a spectral subcomponent image of the first image.

28. The non-transitory, computer-readable medium of claim 23, wherein the plurality of operations further comprise applying regularization processing to the output image.

29. The non-transitory, computer-readable medium of claim 23, wherein the second image is captured temporally proximate to, but not at the same time as, capture of the first image.

* * * * *